United States Patent [19]

Shetty

[11] 3,846,408

[45] Nov. 5, 1974

[54] 2-BENZAZEPINYLALKYLAMINO-BENZAMIDE DERIVATIVES

[75] Inventor: Bola Vithal Shetty, Bombay, India

[73] Assignee: Pennwalt Corporation, Philadelphia, Pa.

[22] Filed: Nov. 16, 1971

[21] Appl. No.: 199,368

Related U.S. Application Data

[60] Continuation-in-part of Ser. No. 108,618, Jan. 21, 1971, abandoned, which is a division of Ser. No. 691,955, Dec. 20, 1967, Pat. No. 3,635,976.

[52] U.S. Cl. 260/239 BB, 260/243 B, 260/247.5 B, 260/256.4 Q, 260/268 BC, 260/293.59, 424/244, 424/246, 424/248, 424/251, 424/267
[51] Int. Cl.. C07d 41/08, C07d 57/02, C07d 99/10
[58] Field of Search .............................. 260/238 BB Primary Examiner—Alton D. Rollins
Attorney, Agent, or Firm—Charles E. Feeny

[57] ABSTRACT

Analgesic 1-(2-[3-(1,2,4,5-tetrahydro-3H,3-benzazepinyl)] alkyl)-1,2,3,4-tetrahydro-4-quinazolinones, 2-(2-[3-(1,2,4,5-tetrahydro-3H,3-benzazepinyl)] alkylamino)benzamides and precursers therefor. Methods are disclosed for preparation of the named compounds. Data regarding symptomatology, analgesic activity, local anesthesia and narcotic antagonism are given. Representative compounds are 1-(2-]3-(1,2,4,5-tetrahydro-3H,3-benzazepinyl)] ethyl) -2-phenyl-1,2,3,4-tetrahydro-4-quinazolinone and 2-(2-[3-(1,2,4,5-tetrahydro-3H,3-benzazepinyl)]ethylamino)benzamide.

1 Claim, No Drawings

2-BENZAZEPINYLALKYLAMINO-BENZAMIDE DERIVATIVES

CROSS-REFERENCES

This application is a continuation-in-part of application Ser. No. 108,618 filed Jan. 21, 1971, now abandoned, which in turn is a division of application Ser. No. 691,955 filed Dec. 20, 1967, now U.S. Pat. No. 3,635,976.

This invention relates to 1-[benzazepinyl-alkyl]-1,2,3 4-tetrahydroquinazolinones, intermediates therefore, and acid addition salts thereof. Both the quinazolinones and the corresponding benzamide intermediates therefor are characterized by having analgesic properties. More partcularly, this invention relates to compounds of the formula:

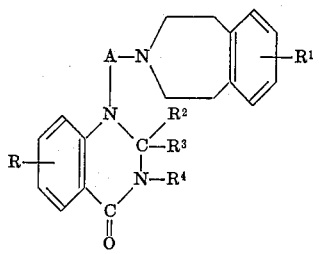

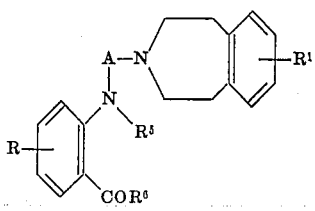

wherein
R is H, loweralkyl, hydroxy, loweralkoxy, halogen, amino, or substituted amino (e.g. NHCOCH$_3$, —NH-CHO);
A is (CH$_2$)$_n$ where $n$ is 1-5, or a branched alkyl with three to five carbon atoms;
R$^1$ is H, OH, loweralkoxy, halogen or loweralkyl;
R$^2$ and R$^3$ each is H, lower alkyl, heterocyclic, aryl, aryl substituted by NH$_2$, OH, OCH$_3$, CH$_3$ or Cl, aralkyl or aralkyl substituted by OH, NH$_2$, OCH$_3$, CH$_3$ or Cl;
R$^2$ and R$^3$ can be joined together to form with the two position carbon atom to which they are attached to cycloaliphatic or heterocyclic ring preferably having three to 10 carbon atoms, either of which rings may be unsubstituted or substitued, e.g. NH$_2$, OH, OCH$_3$, CH$_3$, Cl;
R$^4$ is H, lower alkyl, phenyl; aryl substituted by OH, NH$_2$, OCH$_3$, CH$_3$ or Cl, or arylalkyl substituted by OH, NH$_2$, CH$_3$O, CH$_3$ or Cl;
R$_5$ is H, loweralkyl, heterocyclic, aryl, aralkyl, substituted aralkyl (e.g. NH$_2$, OH, OCH$_3$, CH$_3$, Cl), substituted aryl (e.g. OH, OCH$_3$, NH$_2$, CH$_3$, Cl), or

R$^6$ is OH, loweralkoxy, (e.g. OCH$_3$, OCH$_2$—CH$_3$), heterocyclic (e.g.

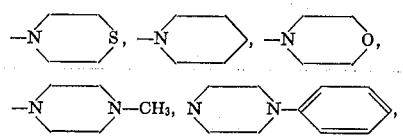

NH$_2$, —NH— loweralkyl, —N= (disubstituted with loweralkyl), phenylamino, substituted arylamino (e.g. the aryl radical substituted by OH, NH$_2$, OCH$_3$, CH$_3$, Cl) aralkylamino, substituted aralkylamino (e.g. the aralkyl radical substituted by OH, NH$_2$, OCH$_3$, CH$_3$, Cl), and pharmacologically acceptable acid addition salts of the above compounds.

The compounds of the present invention may be prepared by various methods which are known in principle. Two convenient methods are illustrated in the following diagram of a general synthetic route, the schematic and short hand representations of which are those known in the art and wherein R' is H or lower alkyl; R'CHCH$_2$ is A, and R" is R$^2$ and/or R$^3$.

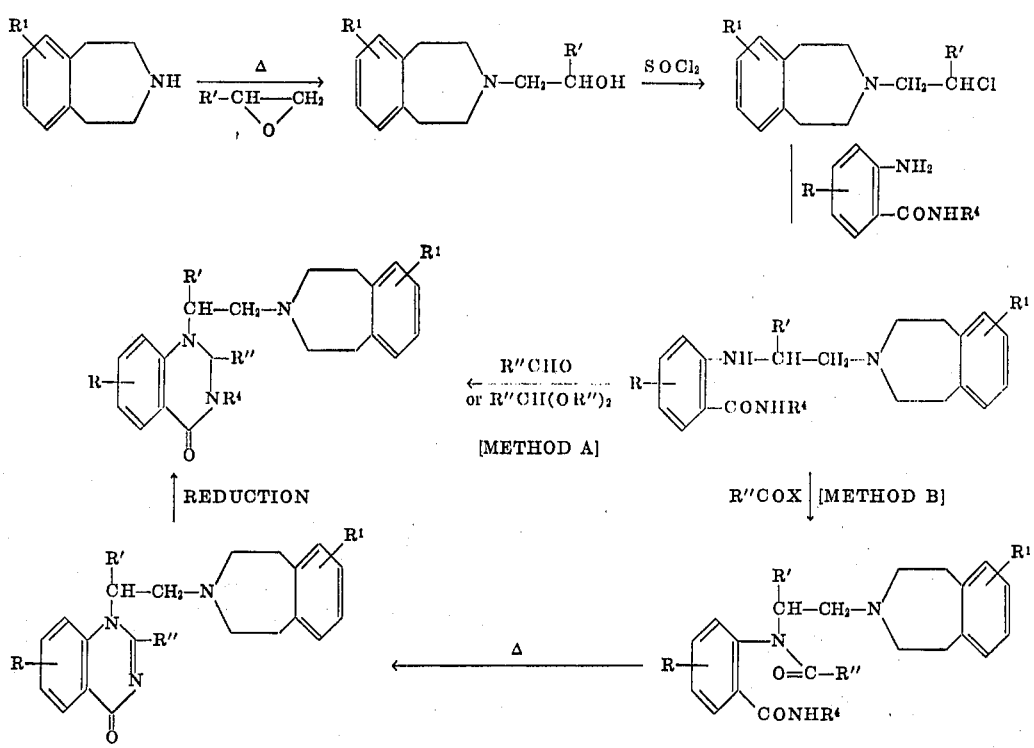

[METHOD A]

[METHOD B]

Typical examples of compounds of this invention are:

1-(2-[3-(1,2,4,5-tetrahydro-3H,3-benzazepinyl)] ethyl)-2-methyl-1,2,3,4-tetrahydro-4-quinazolinone;

1-(2[3-(1,2,4,5-tetrahydro-3H,3-benzazepinyl)] ethyl)-2-phenyl-1,2,3,4-tetrahydro-4-quinazolinone;

1-(2-[3-(1,2,4,5-tetrahydro-3H,3-benzazepinyl)] ethyl)-2-benzyl-1,2,3,4-tetrahydro-4-quinazolinone;

6-Amino-1-(2-[3-(1,2,4,5-tetrahydro-3H,3-benzazepinyl)] ethyl)-1,2,3,4-tetrahydro-4-quinazolinone;

7-Amino-1-(2-[3-(1,2,4,5-tetrahydro-3H,3-benzazepinyl)] ethyl)-1,2,3,4-tetrahydro-4-quinazolinone;

1'-(2-[3-(1,2,4,5-tetrahydro-3H,3-benzazepinyl)] ethyl)-spiro-[cyclopentane-1,2'(1'H)-quinazolin]-4'(3'H)-one;

1-(2-[3-(7-Hydroxy-1,2,4,5-tetrahydro-3H,3-benzazepinyl)] ethyl)-1,2,3,4-tetrahydro-4-quinazolinone;

1-(2-[3-(7-Methoxy-1,2,4,5-tetrahydro-3H,3-benzazepinyl)] ethyl)-1,2,3,4-tetrahydro-4-quinazolinone;

6-amino-1-(2-[3-(1,2,4,5-tetrahydro-3H,3-benzazepinyl)] ethyl)-2-phenyl 1,2,3,4-tetrahydro-4-quinazolinone;

1-(2-[3-(7-hydroxy-1,2,4,5-tetrahydro-3H,3-benzazepinyl)] ethyl)-2-phenyl-1,2,3,4-tetrahydro-4-quinazolinone;

1-(2-[3-(7-methoxy-1,2,4,5-tetrahydro-3H,3-benzazepinyl)] ethyl)-2-phenyl-1,2,3,4-tetrahydro-4-quinazolinone;

1-(2-[3-(1,2,4,5-tetrahydro-3H,3-benzazepinyl)] ethyl)-1,2,3,4-tetrahydro-quinazolinone;

2-(p-aminophenyl)-1-(2-[3-(1,2,4,5-tetrahydro-3H,3-benzazepinyl)] ethyl)-1,2,3,4-tetrahydro-4-quinazolinone;

1-(2-[3-(1,2,4,5-tetrahydro-3H,3-benzazepinyl)] ethyl)-6-hydroxy-2-phenyl-1,2,3,4-tetrahydro-4-quinazolinone;

1-(2-[3-(1,2,4,5-tetrahydro-3H,3-benzazepinyl)] ethyl)-6-methoxy-2-phenyl-1,2,3,4-tetrahydro-4-quinazolinone;

1'-(2-[3-(1,2,4,5-tetrahydro-3H,3-benzazepinyl)] ethyl)-1-methyl-spiro-[piperidine-4,2'(1'H)-quinazolin]-4'(3'H)-one;

2-(2-[3-(1,2,4,5-tetrahydro-3H,3-benzazepinyl)] ethylamino) benzamide;

5-amino-2-(2-[3-(1,2,4,5-tetrahydro-3H,3-benzazepinyl)] ethylamino) benzamide;

4-amino-2-(2-[3-(1,2,4,5-tetrahydro-3H,3-benzazepinyl)] ethylamino) benzamide;

2-(2-[3-(7-hydroxy-1,2,4,5-tetrahydro-3H,3-benzazepinyl)] ethylamino) benzamide;

2-(2-[3-(7-methoxy-1,2,4,5-tetrahydro-3H,3-benzazepinyl)] ethylamino benzamide;

2'-(2-[3-(1,2,4,5-tetrahydro-3H,3-benzazepinyl)] ethylamino)-4-benzoylmorpholine, and 2'-(2-[3-(1,2,4,5-tetrahydro-3H,3-benzazepinyl)] ethylamino)-1-benzoylpiperidine.

If desired the above described compounds may be transformed into their acid addition salts, or quaternary ammonium salts by customary methods. For instance the acid addition salts may be obtained by dissolving the free base in a suitable solvent and acidifying the solution with the desired acid. Suitable pharmacologically effective acid addition salts include the sulfates, hydrochlorides, phosphates, cyclohexyl sulfamates, maleates, citrates, tartrates, succinates, ethane disulfonates, methane sulfonate, isethionates, and the resinates obtained by reacting the amine group of the compound with a cation exchange resin such as a sulfonic, carboxylic, or phosphoric acid cation exchange resin.

To prepare a quaternary ammonium salt the free base is merely reacted with a suitable quaternerizing agent, such as an alkyl halide, an aralkyl halide or dialkyl sulfate, preferably in the presence of an inert organic acid.

The following working examples further illustrate the invention.

EXAMPLE I

Preparation of 2-(2-[3-(1,2,4,5-tetrahydro-3(H),3-benzazepinyl)] ethylamino) benzamide (762–344)

Step 1 — 3-(2-Hydroxyethyl)-1,2,4,5-tetrahydro-3(H),3-benzazepine 1,2,4,5-Tetrahydro-3(H), 3-benzazepine (74.75 g), 30 ml ethylene oxide, and 225 ml dry dioxane were charged into a sealed pressure vessel and heated at 80° for 5 hrs. Another 15 ml ethylene oxide was added and heating continued for another 5 hrs. The solvent was removed on the rotovap and the residue recrystallized from ether-hexane to give 68 g after 3 crops. The solid was dissolved in 600 ml warm ether, decanted from a small amount of insoluble material and 400 ml hexane added to give 24.5 g product m. 84°–87° C. Concentration of the mother liquor gave another 52.5 g of product.

Step 2 — 3-(2-chloroethyl)-1,2,4,5-tetrahydro-3(H), 3-benzazepine hydrochloride

Thionyl chloride (51 ml) was added dropwise to 77 g 3-(2-hydroxyethyl)-1,2,4,5-tetrahydro-3(H), 3-benzazepine hydrochloride in 700 ml dry chloroform. The mixture was refluxed for 2 hr and 20 min, cooled, filtered, and the solid washed with chloroform and then with ether to give 81.4 g (3 crops, crops 2 & 3 by addition of ether to the filtrate), m. 239°–243° (dec)° C.

Step 3 — 2-(2-[3-(1,2,4,5-tetrahydro-3(H),3-benzazepinyl)]-ethylamino) benzamide 3-(2-chloroethyl)-1,2,4,5-tetrahydro-3(H),3-benzazepine hydrochloride (81.4 g) was added to a mixture of 38 g 2-aminobenzamide, 54 g anhydrous sodium acetate, and 150 ml water. The mixture was stirred at reflux for 24 hrs and left overnight at room temp. Conc NH$_4$OH was added to make the mixture alkaline and the mixture was extracted with chloroform. The chloroform extract was washed with water, dried, concentrated, and the residue recrystallized from absolute alcohol to give 38.5 solid, m. 117°–121° C. The mother liquid was acidified with CHl gas, the solid filtered, washed, dissolved in water and the soln made alkaline with sodium hydroxide. The base was extracted with chloroform and recrystallized to give 17.65 g product. A total of 51.7 g product was recrystallized twice to give 37.6 g, m. 120°–123° C. plus a second crop of 6.6 g.

| | C | H | Cl | N |
|---|---|---|---|---|
| Calcd | 58.92 | 6.65 | 18.31 | 10.85 (corrected for 1.28% H$_2$O |
| Found | 58.17 | 6.90 | 17.78 | 10.70 |

EXAMPLE II

Preparation of 1-(2-[3-(1,2,4,5-tetrahydro-3(H),3-benzazepinyl)]ethyl)-2-phenyl-1,2,3,4-tetrahydro-4-quinazolinone hydrochloride (762–353)

A mixture of 20 g 2-(2-[3-(1,2,4,5-tetrahydro-

3(H),3-benzazepinyl)]-ethylamino) benzamide, 160 ml absolute alcohol, 7.6 g benzaldehyde, and 2.8 g piperidine was refluxed 24 hrs. The solvent was removed on a rotovap an the residue dissolved in 100 ml 95 percent alcohol. Dry HCl was added and the solid filtered and washed with 95 percent alcohol to give 28 g of the HCl salt which was recrystallized from 600 ml 50 percent alcohol to give 23.85 g., m. 264°–277° C.

|  | C | H | N |
|---|---|---|---|
| Calcd | 71.96 | 6.50 | 9.68 |
| Found | 71.85 | 6.54 | 9.59 |

PHARMACOLOGICAL ACTIVITY OF COMPOUNDS OF THIS INVENTION

The compounds of this invention, when administered to mice by various routes, have been found to possess effective analgesic activity. These compounds are characterized further by a very low to medium order of toxicity in experimental animals and appear to be substantially non-addicting. In addition to the primary analgesic activity these compounds possess other pharmacological effects of potential utility. Among these other pharmacological properties is activity in the sciatic block test indicating use as a local anesthetic. Different lots of the compounds prepared as disclosed have not been found to display significant differences.

Solutions of compound 762–344 in distilled water were used for all of the tests set forth in Table I. In the case of compound 762–353, a 2 percent suspension of soluble starch (Clearjel) in distilled water was employed as the vehicle for the HNSD and $LD_{50}$ tests; in all other tests set forth in Table I for this compound, distilled water was used as the vehicle.

ANALGESIC ACTIVITY

The writhing test described by Sigmund et al, Proc. Soc. Exp. Biol. and Med. 95:729 (1957) has been applied in both rats and mice as an indication of analgesic activity. This method has been reported to be of value in detecting activity of narcotic antagonist analgesics which sometimes do not exhibit activity with use of other conventional methods. The stimulus of intraperitoneal injection of phenylbenzoquinone results in a writhing syndrone characterized by periodic twisting and stretching of the body with extension of the hind legs. Frequency of writhing has been shown to be reduced or prevented by prior administration of narcotic and non-narcotic analgesics. A test compound is considered to have analgesic properties if, by prior administration, it is able to reduce significantly the number of writhes from that obtained by a group receiving vehicle alone. The dose of compound protecting 50 percent of the animals of determined and expressed as the $ED_{50}$. Ten animals are used at each dose level.

Compound 762–344 shows by its HNSD that it is an effective pharmacological agent of relatively high potency. In addition, it is indicated to be an effective analgesic by the PBQ subcutaneous test. Compound 762–353 has a very low order of toxicity and is indicated by both the oral and subcutaneous PBQ tests to be an effective analgesic.

LOCAL ANESTHETIC ACTIVITY

In the case of both compounds 762–344 and 762–353, a 1percent aqueous solution was used in the tests for local anesthetic activity. The mice used in the sciatic block test (3 mice per compound) were placed in a holder with their hind limbs extended. A quantity of 0.05 ml of the test compound was injected into the area surrounding the sciatic nerve at the juncture of the two major leg muscles.

An effective local anesthetic causes a blockade of the nerves of the lower leg and foot causing the animal, when permitted to walk, to do so flatfooted, rather than its normal habit, up on its toes. Alternatively an effective local anesthetic, by the sciatic block method, can cause the leg to be dragged by the animal when walking so long as effective sciatic block persists. Toxic agents may effect the same apparent results, but the blockade effected by toxic agents is irreversible. However, in contrast to toxic agents, an effective local anesthetic permits recovery of the use of the leg and foot after a period of time.

From Table I, it will be observed that 762–344 gave a positive result in the sciatic block test, indicating an effective local anesthetic activity. (Where a positive result is indicated in Table I ("Pos."), it means that the blockade did take place and that the leg and foot returned to normal after a time.)

NARCOTIC ANTAGONISTS

Certain compounds have the ability to antagonize the activity of strong narcotic analgesics in animals, whereas when tested by conventional methods in mice and rats little or no analgesic can be demonstrated. Some of these compounds have been shown to be very effective analgesics in man. The compounds of this invention were tested for their ability to antagonize narcotic analgesics using oxymorphone, a morphine derivative, which when administered to mice causes pupil dilation. It has been demonstrated in our laboratory that narcotic antagonists are able to reduce this mydriatic response significantly if administered prior to oxymorphone administration, whereas narcotic agents such as morphine and codeine cause no change or cause an increase in the pupil size.

TABLE I

| Compound | I.P.[4] HNSD[1] mg/kg | I.P. $LD_{50}$[2] mg/kg | P.O.[5] PBQ[3] $ED_{50}$ mg/kg | S.C.[6] PBQ $ED_{50}$[2] mg/kg | Local Anesthesia Sciatic Block | Narcotic Antagonism |
|---|---|---|---|---|---|---|
| 762–344 | 10 | 90 | >100 | ~ 6 | Pos. | Neg. |
| 762–353 | 100 | >300 | ~ 84 | ~84 | Neg. | Neg. |

[1]HNSD = Highest non-symptomatic dose. That dose which is the highest that can be administered without appearance of gross effects.
[2]$LD_{50}$ = Median Lethal Dose    $ED_{50}$ = Median Effective Dose
[3]PBQ = Phenylbenzoquinone writhing test for analgesia
[4]I.P. = Intraperitoneal
[5]P.O. = Oral
[6]S.C. = Subcutaneous

The invention claimed is:

1. 2-(2-[3-(1,2,4,5-tetrahydro-3H,3-benzazepinyl)] ethylamino) benzamide.

* * * * *